(12) United States Patent
Cheon et al.

(10) Patent No.: US 11,329,799 B2
(45) Date of Patent: *May 10, 2022

(54) CALCULATION DEVICE FOR ENCRYPTION USING PUBLIC KEY AND ENCRYPTION METHOD THEREOF

(71) Applicant: Crypto Lab Inc., Seoul (KR)

(72) Inventors: Jung Hee Cheon, Seoul (KR); Joo Hee Lee, Seoul (KR)

(73) Assignee: Crypto Lab Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/777,973

(22) Filed: Jan. 31, 2020

(65) Prior Publication Data

US 2020/0169384 A1   May 28, 2020

Related U.S. Application Data

(63) Continuation of application No. 16/462,091, filed as application No. PCT/KR2017/013119 on Nov. 17, 2017.

(30) Foreign Application Priority Data

Nov. 18, 2016 (KR) .................. 10-2016-0154160
Nov. 10, 2017 (KR) .................. 10-2017-0149881

(51) Int. Cl.
*H04L 9/06* (2006.01)
*H04L 9/30* (2006.01)
*H04L 9/08* (2006.01)

(52) U.S. Cl.
CPC .......... *H04L 9/0631* (2013.01); *H04L 9/0869* (2013.01); *H04L 9/30* (2013.01); *H04L 2209/20* (2013.01)

(58) Field of Classification Search
CPC ........ H04L 9/0631; H04L 9/0869; H04L 9/30
(Continued)

(56) References Cited

U.S. PATENT DOCUMENTS 8,861,716 B2    10/2014  Halevi et al.
9,252,954 B2 *   2/2016  Halevi .................. H04L 9/3093
(Continued)

FOREIGN PATENT DOCUMENTS

JP        2013524277 A      6/2013
KR      20130024143 A      3/2013
(Continued)

OTHER PUBLICATIONS

Ding, J. "New cryptographic constructions using generalized LWE.", 2012 (Year: 2012).*
(Continued)

*Primary Examiner* — Kambiz Zand
*Assistant Examiner* — Phuc Pham
(74) *Attorney, Agent, or Firm* — Osha Bergman Watanabe & Burton LLP

(57) ABSTRACT

An encryption method includes: calculating a second random matrix using a first random matrix and a secret key, and generating a ciphertext corresponding to a message using the second random matrix. The generating of the ciphertext includes: performing a rounding process for sending the generated ciphertext to a smaller modulus area. The generating of the ciphertext includes performing message encryption without Gaussian sampling.

11 Claims, 7 Drawing Sheets

(58) Field of Classification Search
USPC .......................................................... 380/30
See application file for complete search history.

(56) References Cited

U.S. PATENT DOCUMENTS

| 9,523,021 | B2 | 12/2016 | Schmucker et al. | |
|---|---|---|---|---|
| 2015/0307738 | A1 | 10/2015 | Schmucker et al. | |
| 2016/0056954 | A1* | 2/2016 | Lee ....................... | H04L 9/0625 380/28 |
| 2017/0104590 | A1* | 4/2017 | Wang ...................... | H04L 9/304 |

FOREIGN PATENT DOCUMENTS

| KR | 20130124115 A | 11/2013 |
|---|---|---|
| KR | 20150081168 A | 7/2015 |
| KR | 20160120062 A | 10/2016 |
| KR | 20160149246 A | 12/2016 |

OTHER PUBLICATIONS

Oded Regev, "On Lattices, Learning with Errors, Random Linear Codes, and Cryptography"; STOC '05; Baltimore, Maryland, USA; May 22-24, 2005 (12 pages).

Alexandre Duc et al., "Better Algorithms for LWE and LWR"; Eurocrypt 2015: Advances in Cryptology; Apr. 14, 2015 (32 pages).

Decision to Grant a Patent issued by the Korean Intellectual Property Office in corresponding application No. 10-2017-0149881 dated Sep. 27, 2018.

International Search Report issued in corresponding application No. PCT/KR2017/013119 dated Mar. 21, 2018 (6 pages).

Written Opinion of the International Searching Authority issued in corresponding application No. PCT/KR2017/013119 dated Mar. 21, 2018 (11 pages).

Written Opinion issued in corresponding Singapore Patent Application No. 11202010938Q dated Jan. 20, 2022 (6 pages).

* cited by examiner

CALCULATION DEVICE FOR ENCRYPTION USING PUBLIC KEY AND ENCRYPTION METHOD THEREOF

CROSS-REFERENCE TO RELATED APPLICATION

This is a Continuation application of U.S. application Ser. No. 16/462,091 filed May 17, 2019, which claims priority to International Application No. PCT/KR2017/013119 filed Nov. 17, 2017, which claims priority to Korean Patent Application Nos. 10-2016-0154160 and 10-2017-0149881 filed Nov. 18, 2016 and Nov. 10, 2017, respectively. The entirety of these applications are incorporated herein by reference.

TECHNICAL FIELD

The disclosure relates to a calculation device for encryption using a public key and an encryption method thereof. More particularly, the disclosure relates to a calculation device for generating a public key using an error, and performing encryption using the public key, and an encryption method thereof.

DESCRIPTION OF RELATED ART

An encryption method may be broadly divided into two categories: a symmetric key encryption method and an asymmetric key encryption method. The symmetric key encryption method is fast because the key used for encryption and the key used for decryption are the same, but the security may not be secured when the key is leaked to the outside. To resolve this problem, the asymmetric key encryption method is used. In the asymmetric key encryption method, a public key disclosed to a third party and a secret key (or a private key) held only by the user are used. The user encrypts and transmits a message using the public key, and the recipient decrypts the ciphertext using his/her secret key.

One of the representative asymmetric key encryption methods is RSA method proposed by Ron Rivest, Adi Shamir and Leonard Adleman in 1978. However, the asymmetric ciphertext of the RSA method can be easily solved by a quantum computer.

Meanwhile, in 2005, Regev proposed a public key encryption method based on learning with errors (LWE) (O. Regev. On lattices, learning with errors, random linear codes, and cryptography. In STOC, LNCS, pages 84-93, 2005). The contents of this dissertation are incorporated herein by reference for the description of the disclosure unless they run counter to the technical idea of the disclosure. The public key encryption method based on the LWE proposed by Regev in the above dissertation and a modified encryption method based thereon will be referred to as "LWE-based public key encryption method".

However, this method has disadvantages that it is not suitable for practical use such as Internet-of-Things (IoT) environment, Transport Layer Security (TLS), cloud computing, and server operation because the parameter size is large and the speed is slow. To resolve this drawback, an encryption method using Gaussian sampling was filed on Nov. 10, 2016 by the inventor of the present disclosure, and assigned Korean patent application No. 10-2016-0149246.

In this method, the decryption speed is fast, but the encryption speed is slow because the encryption involves Gaussian sampling.

The above information is presented as background information only to assist with an understanding of the disclosure. No determination has been made, and no assertion is made, as to whether any of the above might be applicable as prior art with regard to the disclosure.

DETAILED DESCRIPTION

Technical Problem

Aspects of the disclosure are to address at least the above-mentioned problems and/or disadvantages and to provide at least the advantages described below. Accordingly, an aspect of the disclosure is to provide a calculation device for performing effective encryption without Gaussian sampling and an encryption method thereof.

Solution to Problem

In accordance with an aspect of the disclosure, an encryption method is provided. The encryption method includes setting a secret key, and generating a public key using the secret key and an error; and applying the public key to a message, and then performing a rounding process and encrypting the message. The secret key may be a random combination from among −1, 0 and 1. A size of the error may be determined by an error parameter which is greater than zero and less than one.

The generating the public key may include calculating a first random matrix (A) including randomly-determined values, calculating the secret key (s) by randomly combining a column vector of which each component has one value from among −1, 0 and 1 in a matrix form, extracting the error (E) from a discrete Gaussian distribution or a distribution that is within a short statistical distance to the discrete Gaussian distribution, calculating a second random matrix (B) by modulating the first random matrix, the secret key and the error, and calculating the public key including the first random matrix and the second random matrix.

The encrypting the message may include setting a random vector of which each component has a value of −1, 0 and 1, respectively calculating a first value which is obtained by calculating the first random matrix and the random vector, and a second value which is obtained by adding a value obtained by encoding the message to a result value obtained by calculating the second random matrix and the random vector, and performing a rounding process to remove a predetermined number of lower bits for each of the first and second values, and calculating a ciphertext corresponding to the message.

The generating the public key may include setting a ring which is a set of polynomials with a predetermined coefficient, calculating the secret key from the ring, calculating a first random polynomial from the ring, extracting the error from a discrete Gaussian distribution or a distribution that is within a short statistical distance to the discrete Gaussian distribution, calculating a second random polynomial by modulating the error in the first random polynomial and the secret key, and setting the public key including the first random polynomial and the second random polynomial.

The encrypting the message may include setting a random vector of which each component has a value of −1, 0 and 1, respectively calculating a first value which is obtained by calculating the first random matrix and the random vector, and a second value which is obtained by adding a value obtained by encoding the message to a result value obtained by calculating the second random matrix and the random vector, and performing a rounding process to remove a predetermined number of lower bits for each of the first and second values, and calculating a ciphertext corresponding to the message.

The encryption method may further include, based on another message encrypted by the public key being received, decrypting the received another message to the secret key.

In accordance with another aspect of the disclosure, a calculation device is provided. The calculation device includes a memory, and a processor configured to set a secret key, to generate a public key using the secret key and an error, and to store the secret key and the public key in the memory. The processor may be further configured to apply the public key to a message to be encrypted, and then perform a rounding process and encrypt the message. The secret key may be a random combination from among −1, 0 and 1. A size of the error may be determined by an error parameter which is greater than zero and less than one.

The processor may be configured to calculate a first random matrix (A) including randomly-determined vectors, to calculate the error (E) from a discrete Gaussian distribution or a distribution that is within a short statistical distance to the discrete Gaussian distribution, to calculate a second random matrix (B) by modulating the first random matrix, the secret key and the error, and to set the public key including the first random matrix and the second random matrix.

The processor may be configured to set a random vector of which each component has a value of −1, 0 and 1, to respectively calculate a first value which is obtained by calculating the first random matrix and the random vector, and a second value which is obtained by adding a value obtained by encoding the message to a result value obtained by calculating the second random matrix and the random vector, and to perform a rounding process to remove a predetermined number of lower bits for each of the first and second values, and calculating a ciphertext corresponding to the message.

The processor may be configured to set a ring which is a set of polynomials with a predetermined coefficient, to calculate the secret key from the ring, to calculate a first random polynomial from the ring, to extract the error from a discrete Gaussian distribution or a distribution that is within a short statistical distance to the discrete Gaussian distribution, and to calculate a second random polynomial by modulating the error in the first random polynomial and the secret key, and set the public key including the first random polynomial and the second random polynomial.

The processor may be configured to randomly extract a polynomial of which each coefficient has one value from among −1, 0 and 1, to respectively calculate a first value which is obtained by calculating the first random polynomial and the polynomial, and a second value which is obtained by adding a value obtained by encoding the message to a result value obtained by calculating the second random polynomial and the polynomial, and to perform a rounding process to remove a predetermined number of lower bits for each of the first and second values, and calculating a ciphertext polynomial corresponding to the message.

The calculation device may further include a communicator for broadcasting the public key stored in the memory. The processor may be configured to, based on another message encrypted by the public key being received, decrypt the received another message to the secret key.

In accordance with another aspect of the disclosure, a recording medium on which a program code is stored is provided. The program code sequentially performs the steps for calculating a first random matrix (A) including randomly-determined values, calculating a secret key (s) by randomly combining a column vector of which each component has one value from among −1, 0 and 1 in a matrix form, calculating the error from a discrete Gaussian distribution or a distribution that is within a short statistical distance to the discrete Gaussian distribution, calculating a second random matrix (B) by modulating the first random matrix, the secret key and the error, and setting a public key including the first random matrix and the second random matrix.

The program code may further perform the steps for setting a random vector of which each component has a value of −1, 0 and 1, respectively calculating a first value which is obtained by calculating the first random matrix and the random vector, and a second value which is obtained by adding a value obtained by encoding the message to a result value obtained by calculating the second random matrix and the random vector, and performing a rounding process to remove a predetermined number of lower bits for each of the first and second values, and calculating a ciphertext corresponding to the message.

Effect of Invention

According to the various embodiments of the disclosure as described above, more effective and stable encryption can be performed without Gaussian sampling

BRIEF DESCRIPTION OF DRAWINGS

The above and other aspects, and advantages of certain embodiments of the disclosure will be more apparent from the following description taken in conjunction with the accompanying drawings, in which.

The same reference numerals are used to represent the same elements throughout the drawings.

PREFERRED EMBODIMENTS FOR CARRYING OUT THE INVENTION

Figure 1:
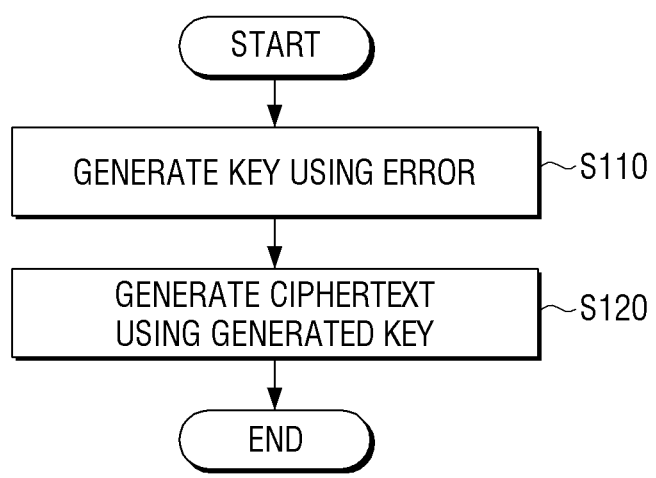
FIG. 1 is a flowchart illustrating an encryption method, according to an embodiment of the disclosure.

Hereinafter, embodiments will be described in more detail with reference to the accompanying drawings. The information (data) transmission process performed in this disclosure may include encryption/decryption as needed. In the disclosure and claims, expressions describing the process of transmitting information (data) are to be construed as including encryption/decryption, even if not mentioned separately. Expressions of the form "transmit (transfer) from A to B" or "receive from B by A" in this disclosure include transmission (transfer) or reception of another medium in between, and do not just represent direct transmission (transfer) from A to B or direct reception from B by A. In the description of the disclosure, the order of each step should be understood to be non-limiting, unless the preceding step must be performed logically and temporally before the following step. In other words, except for the exceptional case above, even if the process described in the following step is performed before the process described in the preceding stage, the nature of the invention is not affected and the scope of the right should be defined regardless of the order of the steps. In addition, "A or B" is defined herein to mean not only selectively pointing to either A or B, but also including both A and B. In addition, it is to be understood that the term "comprise" is intended to encompass further including other elements in addition to the elements listed as being included.

Only essential components necessary for explanation of the present invention are described in this disclosure, and components not related to the essence of the present invention are not mentioned. The present disclosure should not be construed in an exclusive sense that includes only the recited elements, but should be interpreted in a non-exclusive sense to include other elements as well.

In this specification, the term "value" is defined as a concept including not only a scalar value but also a vector.

The mathematical operation and computation of each step of the present invention to be described later can be realized by a computer operation by a coding method well known for carrying out the calculation or the calculation and/or coding designed according to the present invention.

The specific formulas described below are exemplarily described in various possible alternatives, and the scope of the present invention should not be construed as limited to the formulas mentioned in this disclosure.

For convenience of description, the following notation will be used in the disclosure.

Bold English capital letter: Matrix
Bold English lower case: Column vector
$a \leftarrow D$: Select element (a) according to distribution (D)
Ring $R=Z(x)/(f(x))$: Calculate the remainder after dividing by $f(x)$ after the polynomial operation on integer.
$\lfloor \ \rceil$: Round up internal value
$||$: Concatenation; Concatenate column vectors or matrices with the same number of rows side-by-side to yield a new vector or matrix
$HWT_n(h)$: if a set of vectors whose number of nonzero components is h is $B_{n,h}$ (that is, $B_{n,h}$ is a subset of $\{0,\pm1\}^n$), uniform distribution in $B_{n,h}$.

Hereinafter, various embodiments of the disclosure will be described in detail with reference to the accompanying drawings.

FIG. 1 is a flowchart illustrating an encryption method, according to an embodiment of the disclosure. Referring to FIG. 1, a key to be used for encryption may be generated using an error, at operation S110. The key may include a public key and a secret key. For example, a secret key may be randomly set, and a public key may be generated using the secret key, a random value, and an error. The size of an error may be determined by an error parameter which is set to be greater than zero and less than one. For example, an error may be extracted from a discrete Gaussian distribution or an approximate distribution that is within a short statistical distance thereto. In addition, a small value may be used for the secret key. For example, the secret key may be set by randomly combined from among the numbers such as −1, 0, and 1. The public key may be used for encryption, and the secret key may be used for decryption to decrypt an encrypted message. If a key is generated using an error of an unknown value, it is difficult to identify the key even if a third person acquires the message and analyzes it repeatedly. Accordingly, security may be enhanced.

If a message to be transmitted is present, the ciphertext may be generated by performing encryption using the generated public key, at operation S120. For example, the public key may be applied to the message to be transmitted, and a rounding process may be performed. The rounding process refers to processing for sending ciphertext to a smaller modulus area. For example, the rounding process of a vector refers to multiplying by p/q by a real number operation, and then mapping the closest integer value to each component (real number) of the resulting vector. If p and q are set to a power of 2, a predetermined number of least significant bits of each component of the vector may be removed by the rounding process. When the rounding process is performed in this way, it becomes difficult to decrypt even if the third party obtains the ciphertext, and thus the security can be improved. The calculation device may transmit the generated ciphertext to an external device.

In FIG. 1, it is illustrated and described that the step of generating a key and the step of generating ciphertext are performed in one calculation device, but the example is not limited thereto. For example, one calculation device may generate a public key, and then broadcast the public key to external devices. After receiving the public key, an external device may use the public key to make a message a ciphertext. The external device may transmit the ciphertext back to the calculation device, and the calculation device may decrypt the ciphertext using a secret key. In this case, the embodiment described with reference to FIG. 1 may be implemented to include the step of generating a key and the step of transmitting a public key.

A Learning With Error (LWE) method may be applied to the step of generating a key (S110) of FIG. 1, and a Learning with Rounding (LWR) method may be applied to the step of encryption (S120).

Figure 2:
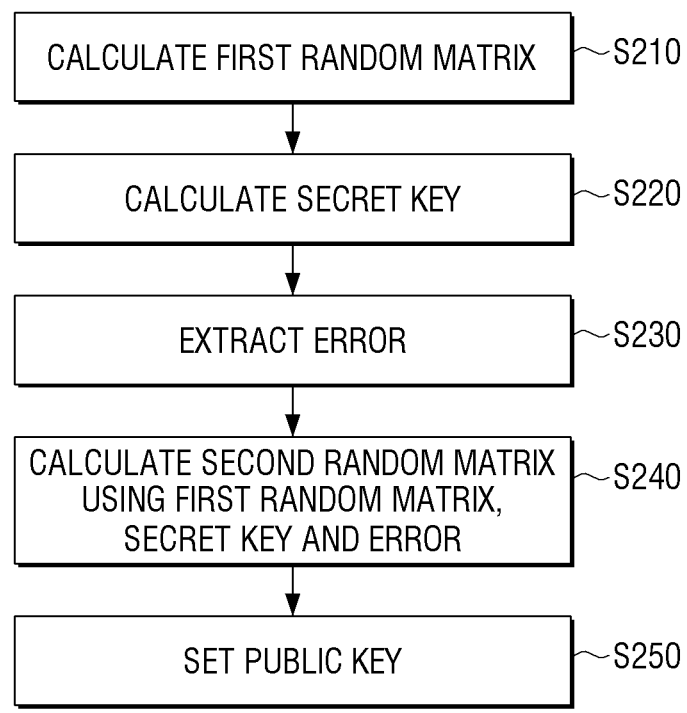
FIG. 2 is a flowchart specifically illustrating an example of a key generation process.

FIG. 2 is a flowchart illustrating a method for generating a key to which the LWE method is applied, according to an embodiment of the disclosure.

In order to perform the respective steps of FIG. 2, a parameter may be set first. Specific parameters are as shown below.

l: Length of plaintext message bits
m: Number of rows of public key
n: Number of columns of public key
p: Maximum value of each element of ciphertext
q: Maximum value of each element of public key
hr: Number of nonzero elements of column vector r
t: Maximum value of each element of plaintext
hs=Number of nonzero elements of secret key
hs<n
hr<m
α is an error parameter greater than zero and less than one.

As α increases, safety increases and p and q also increase, but the calculation speed may be slowed down.

From among the parameters shown above, it may be defined that p is the number of values that each component of ciphertext can have, q is the number of values that each component of a public key can have, and t is the number of values that each component of a plaintext message can have.

The conditions between the above-described parameters are not necessarily limited thereto, and may be variously changed according to an embodiment. For example, p may be divided by t, and q may be set to a value divided by p, or may be set to any value without such a condition.

Referring to FIG. 2, the calculation device may calculate a first random matrix (A) including randomly-determined values. The first random matrix (A) may be calculated as shown in the mathematical formula shown below.

$$A \leftarrow \mathbb{Z}_q^{m \times n} \qquad \text{[Mathematical formula 1]}$$

In the mathematical formula 1, $\mathbb{Z}_q$ is a set of all integers included in the range of $-q/2$ to $q/2$. A is a m x n matrix including values randomly selected from $\mathbb{Z}_q$.

The calculation device may randomly generate a secret key (s), at operation S220. The calculation device may generate a secret key by using a sparse small vector. The secret key may be a vector, or may be a matrix of combinations of vectors. For example, a signed binary secret matrix (S) generated by randomly combining at least one of $-1$, 0, and 1 in a matrix form may be calculated.

In a case where the secret matrix (S) is used as a secret key (sk), the secret key may be expressed as shown below.

$$sk \leftarrow S \in \{0, \pm 1\}^{n \times l} \qquad \text{[Mathematical formula 2]}$$

The calculation device may calculate an error (E), at operation S230. The error (E) is a matrix form, which may be calculated from a discrete Gaussian distribution or a distribution that is within a short statistical distance thereto. For example, an error may be expressed as in the mathematical formula shown below.

$$E = (e_1 \| \ldots \| e_l) \leftarrow D_{\alpha q}^{m \times l} \qquad \text{[Mathematical formula 3]}$$

The mathematical formula 3 means that a discrete Gaussian distribution with a standard deviation of $\sqrt{\alpha q}$ is sampled m times independently to calculate a column vector, and the column vector is concatenated again l times to calculate an error matrix (E).

The error matrix (E) is not necessarily calculated in the same manner as in the mathematical formula 3, but may be calculated by other methods known to be applicable to the LWE-based public key encryption method.

The calculation device may calculate a second random matrix (B) using the generated first random matrix, a secret key, and an error. The second random matrix (B) may be calculated as in the mathematical formula shown below.

$$B = -AS + E \in \mathbb{Z}_q^{m \times l} \qquad \text{[Mathematical formula 4]}$$

The calculation device may calculate a public key using the first random matrix and the second random matrix, at operation S250. For example, a public key may be calculated as shown below, by concatenating the first random matrix and the second random matrix.

$$pk \leftarrow (A \| B) \in \mathbb{Z}_q^{m \times (n+l)} \qquad \text{[Mathematical formula 5]}$$

As shown above, the calculation device may generate a public key using an error. The order of each step of FIG. 2 is only an example, and the order of the steps may be changed according to an embodiment.

When a secret key and a public key are generated, the calculation device may store them. Depending on the operating environment, the calculation device may share at least one of a secret key or a public key with external devices.

Figure 3:
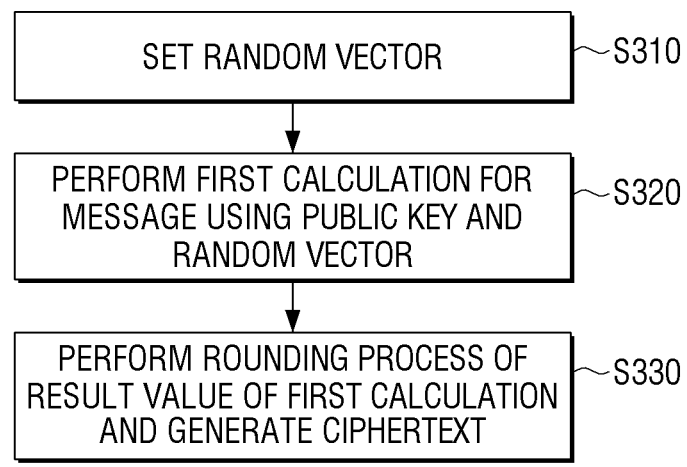
FIG. 3 is a flowchart specifically illustrating an example of a process of encrypting a message.

Meanwhile, as described above, encryption may be performed using a rounding function. FIG. 3 is a flowchart illustrating a method for generating ciphertext of an LWR method, according to an embodiment of the disclosure. Referring to FIG. 3, a calculation device with a message to be transmitted may set a random vector, at operation S310. The random vector may be set so that each component has a value of $-1$, 0, and 1. For example, a random vector may be set as in the mathematical formula shown below.

$$r \leftarrow \mathcal{H}\,WT_m(h_r) \qquad \text{[Mathematical formula 6]}$$

The calculation device may perform a first calculation on a message using a public key and a random vector. The first calculation refers to a process of making a state of ciphertext before the rounding process.

For example, a first value obtained by calculating a first random matrix included in the public key and a random vector may be calculated. In addition, a second value obtained by adding a value obtained by encoding the message to a result value obtained by calculating a second random matrix and a random vector included in the public key may be calculated. The first value and the second value refer to result values of the first calculation described above, and the order of calculation is not limited to any specific order.

For example, the first value ($c_1$) and the second value ($c_2$) may be calculated in the manner as shown below.

$$c_1' = rA$$

$$c_2' = rB + M\left\lfloor\frac{q}{2}\right\rceil \qquad \text{[Mathematical formula 7]}$$

Here, r denotes a random vector, A denotes a first random matrix, B denotes a second random matrix, and M denotes a message. In the mathematical formula 7, the message M is multiplied by a value obtained by rounding $q/2$, but may be multiplied by a value obtained by rounding $q/t$. In this disclosure, the encoding is referred to as changing a value by performing an operation such as a rounding process on the message.

When a first calculation result value is calculated, a rounding process may be performed to calculate ciphertext corresponding to the message, at operation S330.

The ciphertext is not necessarily generated in the same manner as in the mathematical formula 8. According to another example, a ciphertext may be generated in the following manner.

$$c \leftarrow (c_1, c_2) \in \mathbb{Z}_p^{n+1}$$

$$c_1 \leftarrow \lfloor (p/q) \cdot c_1' \rceil \in \mathbb{Z}_p^n; c_1' \leftarrow A^T r$$

$$c_2 \leftarrow (p/t) \cdot m + \lfloor (p/q) \cdot c_2' \rceil \in \mathbb{Z}_p^l; c_2' \leftarrow B^T r \qquad \text{[Mathematical formula 8]}$$

The mathematical formula 7 is a method of adding an encoding value of a message before a rounding process, and the mathematical formula 8 is a method of adding it after a rounding process. The two methods described above may yield ciphertext with the same value when q is a multiple of p and p is a multiple of t.

When ciphertext is generated as described above, a predetermined number of lower bits are removed, and Gaussian sampling is not required. In addition, a secret key and a random vector include a sparse small vector such as 0, $-1$, and 1, and thus the security is secured and the encryption speed becomes very fast. The size of ciphertext can also be significantly reduced.

Although not illustrated in the encryption method of FIG. 1, when a ciphertext generated in the manner described above, that is, a message encrypted using a public key, is received, a step of decrypting the message may be further included. Decryption may be performed using the secret key described above. Decryption may be performed in the following method.

$$m \leftarrow \lfloor t/p \cdot (S^T a + b) \rfloor \pmod{t} \quad \text{[Mathematical formula 9]}$$

In the example described above, the key generation is performed based on the LWE method and the encryption is performed based on the LWR method. However, according to another embodiment of the disclosure, the key generation and encryption may be based on a ring. For convenience of explanation, this method will be referred to as an R-LWE method and an R-LWR method.

Figure 4:
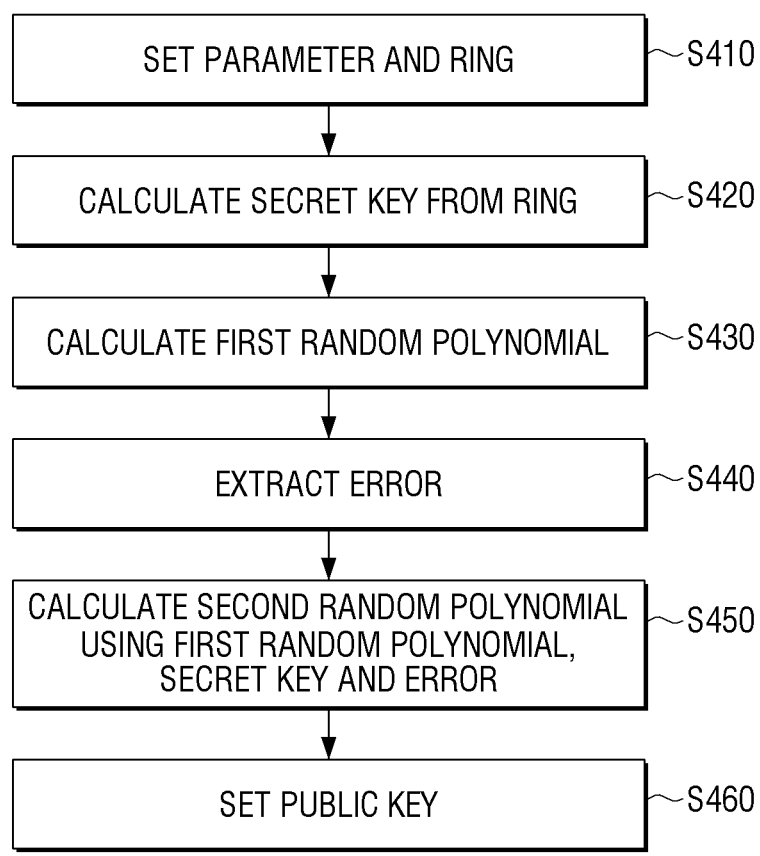
FIG. 4 is a flowchart specifically illustrating another example of a key generation process.

FIG. 4 is a flowchart illustrating a method for generating a key based on a ring. For example, the R-LWE method may be used in the key generation process. Referring to FIG. 4, the calculation device may set parameters and a ring, at operation S410. The parameters were explained in detail above, and thus repeated explanation is omitted. The ring may be expressed as in the mathematical formula as shown below.

$$R = \frac{\mathbb{Z}_q[x]}{(f(x))} \quad \text{[Mathematical formula 10]}$$

The ring refers to a set of polynomials with a predetermined coefficient. For example, the ring refers to a set of n-order polynomials with a coefficient Zq. In the mathematical formula 10, f(x) denotes an n-order polynomial. For example, if n is $\Phi(N)$, f(x) denotes an n-order cyclotomic polynomial. (F(x)) denotes an ideal of Zq[x] generated by f(x). $\Phi(N)$ denotes the number of natural numbers less than N. When $\Phi N(x)$ is defined as an n-order cyclotomic polynomial, a ring may be expressed as in the mathematical formula as shown below.

$$R = \frac{\mathbb{Z}_q[x]}{\Phi_N(x)} \quad \text{[Mathematical formula 11]}$$

Then, the calculation device may calculate a secret key (sk) from the ring, at operation S420.

$$sk \leftarrow S(x) \leftarrow R \quad \text{[Mathematical formula 12]}$$

S(x) is a polynomial in which each coefficient is 0, −1, and 1. For example, S(x) may be calculated to follow a distribution of HWTn(hs). The calculated polynomials may be set to the secret key (sk).

Then, a first random polynomial (a(x)) may be calculated from the ring, at operation S430. The first random polynomial may be expressed as shown below.

$$a(x) \leftarrow R \quad \text{[Mathematical formula 13]}$$

In addition, the calculation device may extract an error from a discrete Gaussian distribution or a distribution that is within a short statistical distance thereto. An error may be expressed as in the mathematical formula as shown below.

$$e(x) \leftarrow D_{aq}^n \quad \text{[Mathematical formula 14]}$$

When an error is calculated, the calculation device may modulate the error with the first random polynomial and the secret key, and produce a second random polynomial, at operation S450. The second random polynomial may be expressed as shown below.

$$b(x) = a(x)s(x) + e(x) \quad \text{[Mathematical formula 15]}$$

Finally, the public key (pk) may be set as shown below, so that the first random polynomial and the second random polynomial are included, at operation S460.

$$pk = (a(x), b(x)) \quad \text{[Mathematical formula 16]}$$

Figure 5:
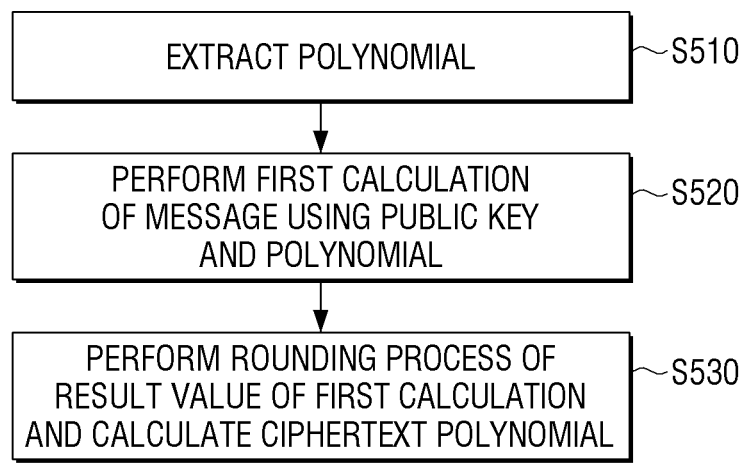
FIG. 5 is a flowchart specifically illustrating another example of a process of encrypting a message.

FIG. 5 is a flowchart illustrating a method for generating ciphertext based on an R-LWR method. Referring to FIG. 5, a polynomial is randomly extracted as in the mathematical formula shown below, at operation S510.

$$r(x) \in \{-1, 0, 1\}n \quad \text{[Mathematical formula 17]}$$

Then, a first calculation on a message may be performed using a public key and a polynomial, at operation S520. The first calculation refers to, as described above, a process of calculating a first value and a second value using the first random polynomial, the second random polynomial, the polynomial and the message described above, etc. For example, a first value obtained by calculating the first random polynomial and the polynomial, and a second value obtained by adding a value obtained by encoding a message in a result value obtained by calculating the polynomial and the second random polynomial included in the public key may be respectively calculated. The first value and the second value ($c_1'$ and $c_2'$) may be expressed as in the mathematical formula shown below.

$$c_1'(x) = r(x)\, a(x) \quad \text{[Mathematical formula 18]}$$

$$c_2'(x) = \frac{q}{t} m(x) + r(x)\, b(x)$$

When the first calculation is performed, a rounding process of the result value thereof may be performed, and a ciphertext polynomial may be calculated, at operation S530. For example, a rounding process of each of the first and second values may be performed to remove a predetermined number of lower bits, and a ciphertext polynomial corresponding to the message may be calculated. The ciphertext polynomial may be expressed as shown below.

$$c(x) = (c_1(x), c_2(x))$$

$$c_1(x) = \lfloor p/q \cdot r(x) a(x) \rceil$$

$$c_2(x) = \lfloor p/q (q/t \cdot m(x) + r(x) b(x)) \rceil \quad \text{[Mathematical formula 19]}$$

The above-described ciphertext polynomial may be calculated in a ring. Here, the $c_2(x)$ may be calculated as in the mathematical formula shown below.

$$c_2(x) = \lfloor \frac{p}{t} m(x) + \frac{p}{q} \cdot r(x) \cdot b(x) \rceil \text{ in } R_p \quad \text{[Mathematical formula 20]}$$

As described with reference in FIGS. 4 and 5, the key generation and the ciphertext generation are possible based on a ring. A calculation device may provide the generated public key to external devices. An external device receiving the public key may, when a message to be transmitted to the calculation device is present, perform encryption using the public key, and transmit the encrypted message. When the calculation device receives the encrypted message, decryption may be performed using a secret key. A method for encryption of ciphertext generated as illustrated in FIGS. 4 and 5 may be expressed as in the mathematical formula shown below.

$$c_2(x) - S(x)c_1(x) = \frac{p}{t}m(x) + \Delta e \xrightarrow{\lfloor t/px \rfloor} m(x) \quad \text{[Mathematical formula 21]}$$

Here, the noise Δe is disappeared in the decryption process as the lowest bit is deleted by the $\lfloor t/p \cdot x \rfloor$. Even if encryption is performed as illustrated in FIGS. 4 and 5, the lowest bit is deleted in the encryption process and thus, the effect as in the other embodiment described above cannot be obtained.

The key generation, encryption and decryption process as described above may be performed by the calculation device. The calculation device may be a computer, but is not limited thereto. For example, various terminals such as a server device, a mobile phone, a laptop PC, a tablet PC and the like, provided with a communication function may perform the operation described above. In the disclosure, a device capable of performing operations according to the various embodiments as described above will be commonly referred to a calculation device.

Figure 6:
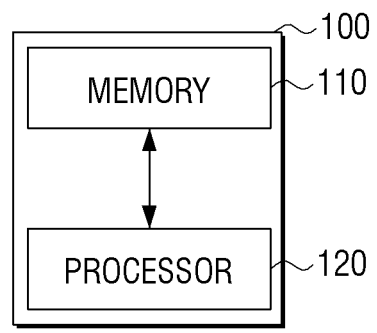
FIG. 6 is a flowchart illustrating a configuration of a calculation device, according to an embodiment of the disclosure.

FIG. 6 is a flowchart illustrating a configuration of a calculation device, according to an embodiment of the disclosure. Referring to FIG. 6, the calculation device 100 may include a memory 110 and a processor 120. The memory 110 is configured to store an Operating System (O/S), various software and data necessary for operating the calculation device 100. The memory 110 may be a variety of forms such as RAM, ROM, flash memory, HDD, external memory, memory card and the like, and is not limited to any one.

The processor 120 is an element for executing a program stored in the memory 110 and performing various calculation operations.

For example, the processor 120 may set a secret key, and generate a public key using an error and a secret key. The processor 120 may store the generated secret key and the generated public key in the memory.

The stored keys may be used in various operations. For example, when a message to be transmitted to the outside or a message for which encryption is required is input, the processor 120 may apply the public key stored in the memory 110 to a message, and then perform a rounding process to encrypt the message. Here, the secret key may be set as a small value. For example, the secret key may be a random combination from among −1, 0 and 1, as described in the embodiments described above. The various embodiments of encryption operation of the processor are described with reference to FIGS. 1 to 5, and thus repeated explanation is omitted.

Although not illustrated in FIG. 6, the calculation device 100 may further include a communicator (not illustrated). The communicator is configured to perform communication with external devices.

The processor 120 may broadcast the public key stored in the memory 110 via the communicator. In addition, when an external device to use the public key is determined, the public key may be transmitted to an Internet Protocol (IP) address of that external device.

When encryption is performed in external devices receiving the public key, the processor 120 may receive ciphertext via the communicator. The processor 120 may decrypt the ciphertext using the secret key stored in the memory 110.

In addition, the calculation device 100 may further include various elements such as input means, display, bus and the like, according to the type of the calculation device. However, these elements are not directly related to the various embodiments of the disclosure, and thus the illustration and description thereof are omitted herein.

Figure 7:
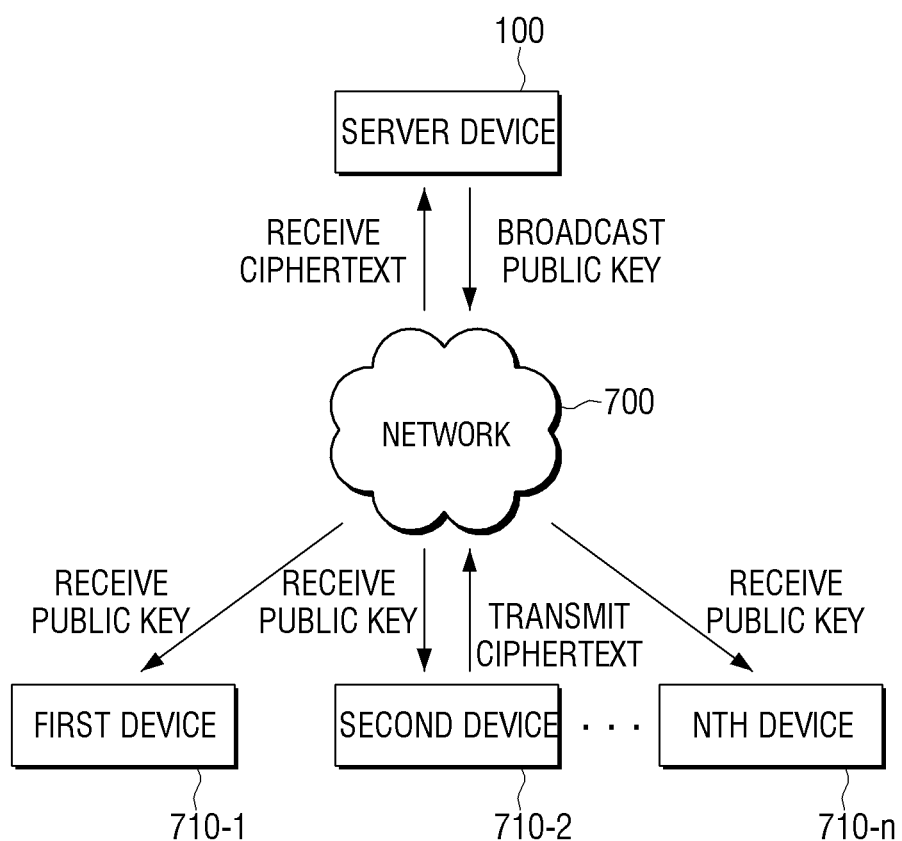
FIG. 7 is a diagram illustrating a system for performing encryption/decryption, according to an embodiment of the disclosure.

FIG. 7 is a diagram illustrating a system for performing encryption/decryption, according to an embodiment of the disclosure. Referring to FIG. 7, the system may include a server device 100 and various external devices 710-1 to 710-n. The respective devices may be interconnected via a network 700.

The server device 100 may generate a public key as described in the various embodiments described above, and then broadcast the generated public key via the network. The devices 710-1 to 710-n of various types connected to the network 700 may receive a public key. In a case that a second device 710-2 from among the devices is to access the server device 100, the second device 710-2 may encrypt a message to be transmitted using the public key, and then transmit the ciphertext. The server device 100 may receive the ciphertext, and then perform decryption using a secret key.

If the second device 710-2 is capable of performing the key generation operation as described above, the second device 710-2 may generate a public key and a secret key on its own. The second device 710-2 may transmit the public key to the server device 100. In this case, the second device 710-2 may encrypt the public key and transmit the encrypted public key.

In a case that the public key is provided from the second device 710-2, when a message to be transmitted to the second device 710-2 is present, the server device 100 may encrypt the message using the received public key, and then transmit the encrypted message. Accordingly, communication security between the server device 100 and the second device 710-2 can be enhanced.

In addition, the server device 100 may generate a secret key and a public key, and then provide all the keys to a specific device. A device receiving the secret key and the public key may use the keys to communicate with external devices.

Meanwhile, a program code for performing at least one of the key generation, encryption and decryption process according to the various embodiments as described above may be stored in a recording medium and distributed. In this case, a device on which a recording medium is mounted may perform the operations described above. For example, a program code may be stored in a recording medium. The program code is to sequentially perform the steps for calculating a first random matrix (A) including randomly-determined values, calculating a secret key (s) by randomly combining a column vector of which each component has one value from among −1, 0 and 1 in a matrix form, extracting an error (E) from a discrete Gaussian distribution or a distribution that is within a short statistical distance thereto, calculating a second random matrix (B) by modulating a first random matrix, a secret key and an error, setting a public key including the first random matrix and the second random matrix, setting a random vector from among −1, 0 and 1, respectively calculating a first value obtained by calculating the first random matrix and the random vector, and a second value obtained by adding a value obtained by encoding a message in a result value obtained by calculating the second random matrix and the random vector, and performing a rounding process for removing a predetermined number of lower bits for each of the first and second values, and calculating a ciphertext corresponding to the message.

The recording medium may be a computer-readable medium of various types, such as ROM, RAM, a memory chip, a memory card, an external hard drive, a hard drive, a compact disc (CD), a digital versatile disc (DVD), a magnetic disc, or a magnetic tape.

As described above, when the key generation and encryption according to the various embodiments of the disclosure is performed, it is safe even in the age of quantum computers, the encryption/decryption speed can be greatly improved, and the size of ciphertext can be reduced. In particular, the generated random value and the secret key may be set using a small vector in the encryption process, and a process of removing lower bits in the encryption process may be performed. Thereby, efficiency can be maximized.

Although the description of the disclosure is made with reference to the accompanying drawings, the scope of the rights is defined by the appended claims and is not construed as being limited to the described embodiments and/or the drawings. In addition, it should be understood that the disclosure includes various improvements, modifications and changes of the embodiments of the claims which are obvious to those skilled in the art are included in the scope of rights of the disclosure.

What is claimed is:

1. An encryption method, comprising:
   calculating a second random matrix using a first random matrix and a secret key;
   generating a ciphertext corresponding to a message using the second random matrix; and
   transmitting, over a network, the ciphertext to a server device that decrypts the ciphertext, wherein
   the generating the ciphertext comprises:
      performing a rounding process for sending the generated ciphertext to a smaller modulus area,
   the generating the ciphertext further comprises:
      calculating a first value which is obtained by calculating the first random matrix and a random vector, and calculating a second value which is obtained by adding a value obtained by encoding the message to a result value obtained by calculating the second random matrix and the random vector, and
      performing a rounding process for the first value, and performing a rounding process for the result value obtained by calculating the second random matrix and the random vector.

2. The encryption method as claimed in claim 1, wherein the generating the ciphertext comprises performing message encryption without Gaussian sampling.

3. The encryption method as claimed in claim 1, further comprising:
   calculating the first random matrix including randomly-determined values;
   calculating the secret key;
   calculating a public key using the second random matrix.

4. The encryption method as claimed in claim 3, wherein the calculating the secret key comprises calculating the secret key by randomly combining a column vector of which each component has one value from among −1, 0 and 1 in a matrix form.

5. The encryption method as claimed in claim 3, further comprising:
   extracting an error from a discrete Gaussian distribution or a distribution that is within a short statistical distance to the discrete Gaussian distribution,
   wherein a size of the error is determined by an error parameter which is greater than zero and less than one.

6. A calculation device, comprising:
   a memory configured to store a second random matrix obtained by calculating a first random matrix and a secret key; and
   a processor configured to generate a ciphertext corresponding to a message using the second random matrix and transmit, over a network, the ciphertext to a server device that decrypts the ciphertext, wherein
   the processor is configured to:
      perform a rounding process for sending the generated ciphertext to a smaller modulus area, and
   the processor is further configured to:
      calculate a first value which is obtained by calculating the first random matrix and a random vector, and
      calculate a second value which is obtained by adding a value obtained by encoding the message to a result value obtained by calculating the second random matrix and the random vector,
      perform a rounding process for the first value, and
      perform a rounding process for the result value obtained by calculating the second random matrix and the random vector.

7. The calculation device as claimed in claim 6, wherein the processor performs message encryption without Gaussian sampling.

8. The calculation device as claimed in claim 6, wherein the processor is configured to:
   extract an error from a discrete Gaussian distribution or a distribution that is within a short statistical distance to the discrete Gaussian distribution,
   wherein a size of the error is determined by an error parameter which is greater than zero and less than one.

9. The calculation device as claimed in claim 6, wherein the processor is configured to:
   calculate the first random matrix including randomly-determined values;
   calculate the secret key;
   calculate a public key using the second random matrix.

10. The calculation device as claimed in claim 9, wherein the processor is configured to:
    calculate the secret key by randomly combining a column vector of which each component has one value from among −1, 0 and 1 in a matrix form.

11. A non-transitory computer-readable medium on which a program code is stored, the program code sequentially performing the steps for:
    calculating a second random matrix using a first random matrix and a secret key;
    generating a ciphertext corresponding to a message using the second random matrix; and
    transmitting, over a network, the ciphertext to a server device that decrypts the ciphertext, wherein
    the generating the ciphertext comprises:
       performing a rounding process for sending the generated ciphertext to a smaller modulus area, and
    the generating the ciphertext further comprises:
       calculating a first value which is obtained by calculating the first random matrix and a random vector, and calculating a second value which is obtained by adding a value obtained by encoding the message to a result value obtained by calculating the second random matrix and the random vector, and
       performing a rounding process for the first value, and performing a rounding process for the result value obtained by calculating the second random matrix and the random vector.

* * * * *